United States Patent [19]

Andersson

[11] Patent Number: 5,706,955
[45] Date of Patent: Jan. 13, 1998

[54] DEVICE FOR CD BOXES

[76] Inventor: Bengt Andersson, Slottagardsgatan 5, S-235 35 Vellinge, Sweden

[21] Appl. No.: 586,651

[22] PCT Filed: Jul. 1, 1994

[86] PCT No.: PCT/SE94/00654

§ 371 Date: Mar. 6, 1996

§ 102(e) Date: Mar. 6, 1996

[87] PCT Pub. No.: WO95/01638

PCT Pub. Date: Jan. 12, 1995

[30] Foreign Application Priority Data

Jul. 2, 1993 [SE] Sweden ................................ 9302291

[51] Int. Cl.$^6$ ............................................. A47F 7/00
[52] U.S. Cl. ................... 211/40; 211/88; 206/308.1; 206/387.14; D6/407
[58] Field of Search ................... 211/40, 88, 89; D6/407, 629; 248/37.6; 206/308.1, 387.14, 477, 478, 560, 565

[56] References Cited

U.S. PATENT DOCUMENTS

| | | | |
|---|---|---|---|
| 2,742,161 | 4/1956 | Nuttall | 211/40 X |
| 2,883,061 | 4/1959 | Moore | 211/89 X |
| 2,916,159 | 12/1959 | O'Neill | 211/89 |
| 3,281,066 | 10/1966 | Becklin | 211/89 X |
| 3,343,684 | 9/1967 | Galier | 211/89 |
| 3,515,284 | 6/1970 | Taylor | 211/89 X |
| 3,946,877 | 3/1976 | Galicia | 211/89 X |
| 4,304,382 | 12/1981 | Jelen | 211/89 X |
| 4,763,797 | 8/1988 | Egan | 211/89 X |
| 4,867,302 | 9/1989 | Takahashi | 206/308.1 X |
| 4,880,192 | 11/1989 | Vom Braucke et al. | 211/89 |
| 4,951,826 | 8/1990 | Tompkins | 211/88 X |
| 5,040,687 | 8/1991 | Whittington | 211/88 X |
| 5,120,012 | 6/1992 | Rosenau | 211/89 X |
| 5,165,629 | 11/1992 | Breveglieri | 211/89 X |
| 5,232,089 | 8/1993 | Kim | 206/309 |
| 5,255,800 | 10/1993 | Kelly | 211/89 |
| 5,351,835 | 10/1994 | Hallgren | 211/88 X |
| 5,388,713 | 2/1995 | Taniyama | 206/308.1 X |
| 5,456,368 | 10/1995 | Zehnder | 211/40 |
| 5,515,968 | 5/1996 | Taniyama | 206/308.1 X |
| 5,515,981 | 5/1996 | Gregory et al. | 211/89 X |
| 5,518,125 | 5/1996 | Colosimo | 211/88 X |
| 5,542,531 | 8/1996 | Yeung | 206/308.1 |
| 5,603,415 | 2/1997 | Balnis | 211/40 |
| 5,622,270 | 4/1997 | Bezos | 211/40 |
| 5,628,414 | 5/1997 | Heathcote | 211/40 |

FOREIGN PATENT DOCUMENTS

| | | |
|---|---|---|
| 0422318 | 4/1991 | European Pat. Off. . |
| 0504771 | 8/1992 | European Pat. Off. . |
| 8907318 | 8/1989 | WIPO . |
| 9210115 | 6/1992 | WIPO . |

*Primary Examiner*—Robert W. Gibson, Jr.
*Attorney, Agent, or Firm*—Merchant, Gould, Smith, Edell, Welter & Schmidt, P.A.

[57] ABSTRACT

Device (16) for mounting and exposing on a substantially vertical surface CD-boxes (11) of the type comprising a bottom part (26) with a hinged cover (27), the bottom part (26) comprising a lower part (28) and an upper part (29) attached to the lower part by snap action, the bottom part (26) forming at one of the two opposite edges a gap (30) between the lower part and the upper part and at the other one of these opposite edges a projecting rib (31). The device comprises two limbs (19, 20) projecting from said surface mutually spaced a distance corresponding to the width of the box. One limb (19) has an edge flange (21) pointing towards the other limb, while said other limb (20) has at least one projection (23). The box is mounted between the limbs (19, 20) by the flange (21) being inserted into the gap (30) and the projection then being allowed to snap over the rib.

6 Claims, 3 Drawing Sheets

DEVICE FOR CD BOXES

FIELD OF THE INVENTION

The present invention relates to a device for mounting and exposing CD-boxes on a substantially vertical surface, e.g. a wall.

BACKGROUND OF THE INVENTION

There are different types of CD-racks for storing CDs (compact discs) wherein the CD-boxes are placed side by side or above each other. In such CD racks only the back of the CD-box will be exposed, the name of the artiste and the disc being read from said back, while the often artistic disc wrapper is hidden completely by adjacent boxes.

There are, however, also CD racks formed as latticeworks of rails which are attached to a wall, the boxes being loosely placed with the front side facing outwards in order to expose the disc wrapper. Since such a device contains a limited number of CDs only such discs as are played more frequently by the owner for the time being are placed in the device.

This is not a drawback. It has been found that during a certain period a limited number of discs usually are played more often than others even if the owner owns a large number of CD:s. The advantage is that the owner can be inspired by the exposed disc wrappers when choosing the disc and often it is the mood and the disc wrapper that determine the choice. This method of exposing the discs therefore is preferred but the drawback of the prior art CD rack is that the CD-boxes must be removed from the rack when the discs are to be played.

SUMMARY OF THE INVENTION

The purpose of the invention is to facilitate considerably the handling of CD-boxes and above all to provide a device for mounting and exposing CD-boxes wherein the CD-boxes need not be removed when the discs are to be played. The invention is based on the fact that CD-boxes of standard type comprise a bottom part with a hinged cover, the bottom part comprising a lower part and an upper part attached to the lower part by snap action, the bottom part forming at one of two opposite edges a gap between the lower part and the upper part and at the other one of these opposite edges a projecting rib. For said purpose the device has obtained the characterizing features of claim 1.

BRIEF DESCRIPTION OF THE DRAWINGS

In order to explain the invention in more detail an illustrative embodiment thereof will be described below reference being made to the accompanying drawings wherein.

DETAILED DESCRIPTION OF THE PREFERRED EMBODIMENT

Figure 1:
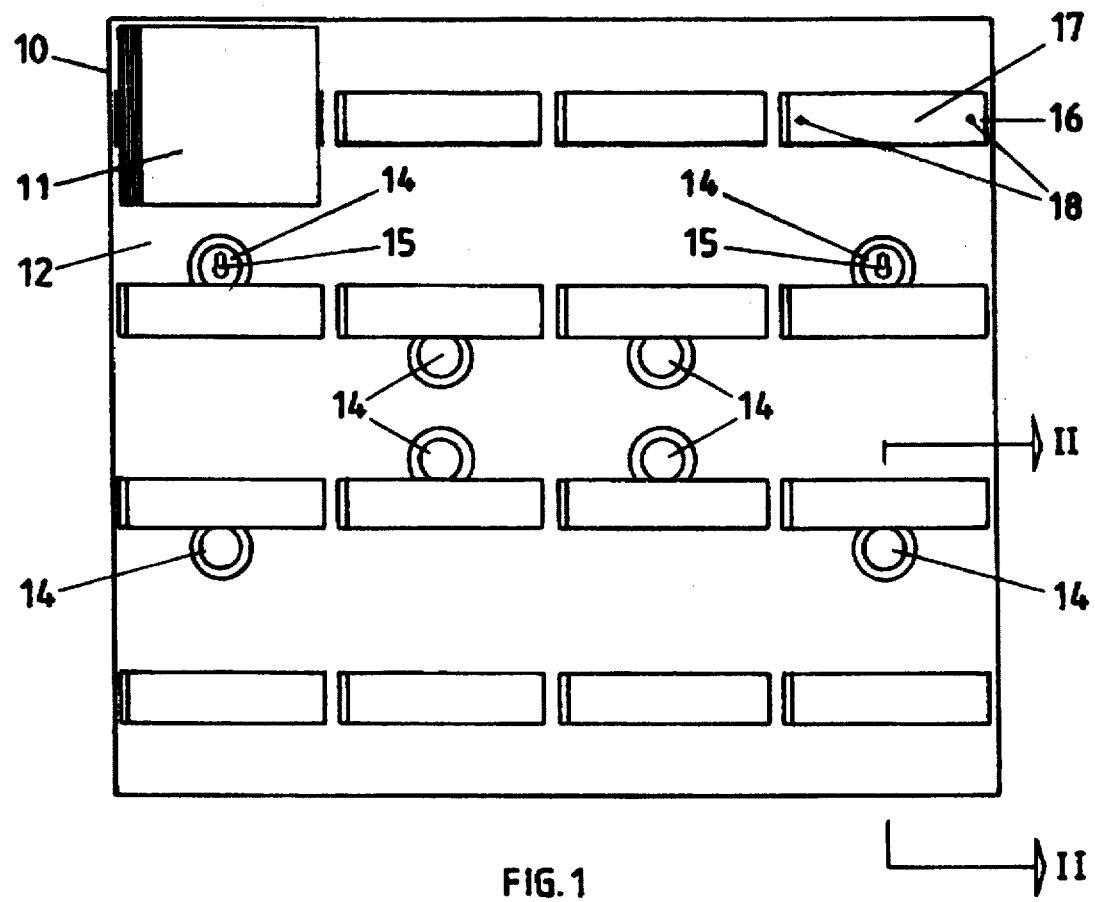
FIG. 1 is a front view of a board including the device of the invention.
Figure 2:
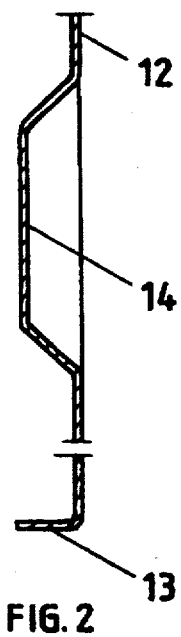
FIG. 2 is an enlarged transverse cross sectional view along line II—II in FIG. 1.
Figure 3:
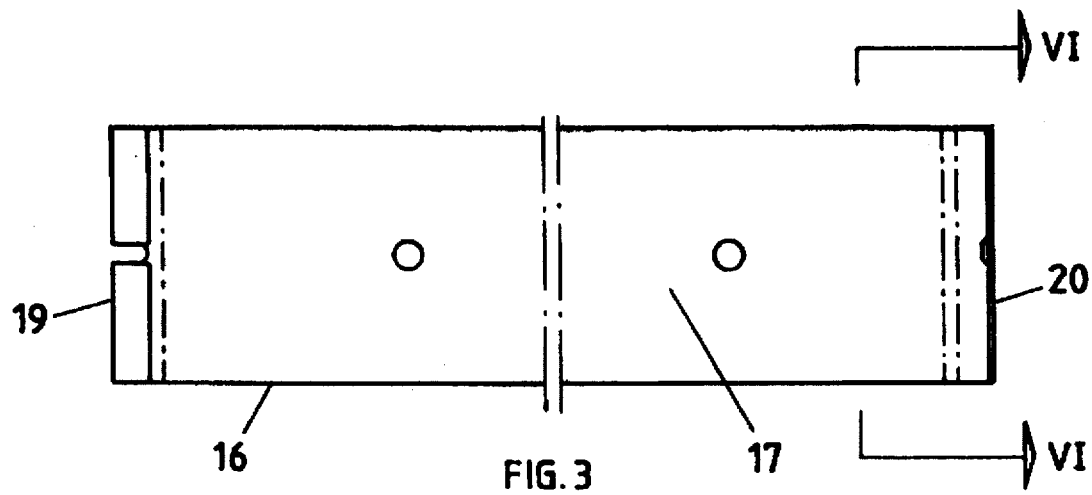
FIG. 3 is an enlarged front view of the device according to the invention.
Figure 4:
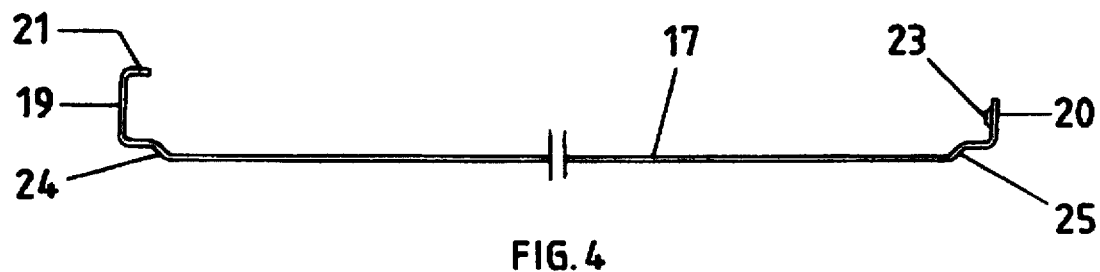
FIG. 4 is a side view of the device in FIG. 3.
Figure 5:
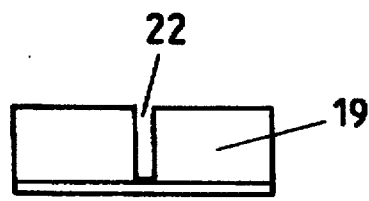
FIG. 5 is an end view as seen from the left in FIG. 4.
Figure 6:
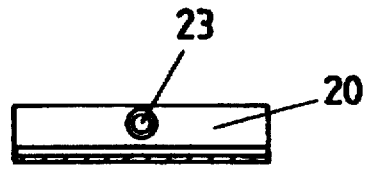
FIG. 6 is a transverse cross sectional view along line VI—VI in FIG. 3.

FIGS. 1 and 2 disclose a board 10 of metal sheet for mounting and exposing CD-boxes 11. The board forms a flat surface 12 with an edge flange 13 bent backwards and extending around the board. In the flat surface of the board there are a number of circular depressions 14 two of which located on line with each other have openings 15 formed as key openings for suspending the board against a wall or the like. The depth of the depressions 14 is slightly smaller (some tenths of a mm) than the width of the edge flange 13 bent backwards so that when the depressions 14 engage the wall it is guaranteed that also the edge flange 13 engages the wall to provide a neat mounting of the board.

On the flat surface 12 of the board 10 there are provided sixteen regularly distributed metal sheet brackets 16 having a web 17, which engages the surface 12 and can be attached to said surface by spot welding at 18, and having two substantially perpendicularly projecting limbs 19 and 20 mutually spaced a distance corresponding to the width of the CD-box. A single bracket 16 is shown in more detail in FIGS. 3–6.

One limb 19 has an edge flange 21 directed towards the other limb 20 and having a slot 22. Said other limb 20 has a wart-like embodiment 23. The limbs 19 and 20 join the web 17 via shoulder portions 24 and 25, the end portions of the web thus being raised in relation to the rest of the web so that the limbs can more easily be elastically moved apart.

Figure 7:
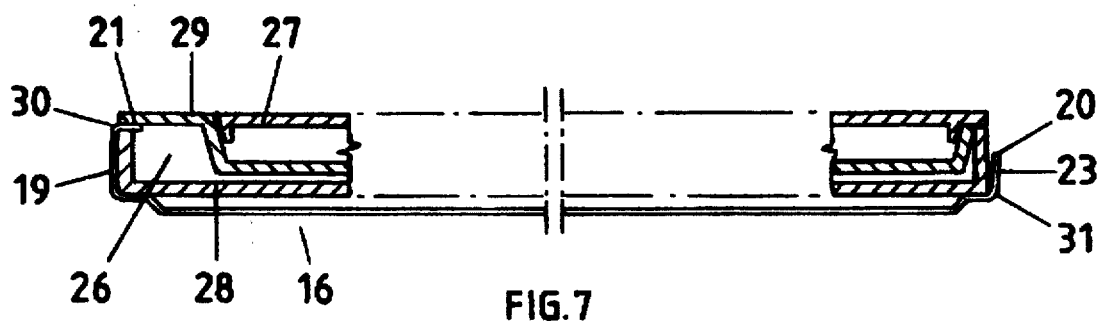
FIG. 7 is a side view of the device according to the invention with a CD-box mounted therein said box being shown in transverse cross sectional view.
Figure 8:
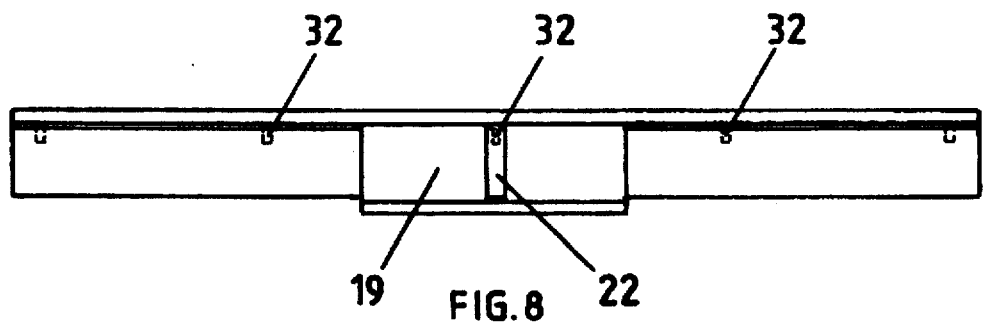
FIG. 8 is an end view as seen from the left in FIG. 7 of the device with the CD-box mounted therein.

In FIGS. 7 and 8 there is disclosed a CD-box 11 which is mounted in a bracket 16. CD-boxes of conventional type include a bottom part 26 with a cover 27 that can be swung outwards, the bottom part 26 comprising a lower part 28 and an upper part 29 attached to the lower part by snap action. At one of two opposite edges the bottom part 26 forms a gap 30 between the lower part 28 and the upper part 29, and at the other one of these opposite edges the bottom part 26 forms a projecting rib 31.

When the CD-box 11 is mounted between the projecting limbs 19, 20 the edge flange 21 is inserted into the gap 30 between the lower part 28 and the upper part 29 of the CD-box 11. Then, the box is pressed against the web 17 and the embossment 23 is allowed to snap over the rib 31, the limbs moving slightly apart elastically.

At the edge of the bottom part which forms the gap 30 between the lower part 28 and the upper part 29 conventional CD-boxes form, at the lower side of the upper part 29, several fins 32 mutually spaced in the longitudinal direction of the edge, which can be utilized for centering the CD-box in the bracket. Usually a fin 32 is provided at the center of the edge of the box, and by this central fin being received by the slot 22 of the limb 19 the centering of the box will be achieved. Alternatively, the CD-box can be centered by the width of the limb 19 corresponding to the distance between two fins 32 which are located at opposite sides of the center of the edge of the box if no centrally located fin is provided.

When a disc is to be played the cover of the CD-box is easily opened with the box remaining on the bracket 16. Then, the disc is taken out and the cover is closed again. The disc is replaced into the box in the same easy way.

The brackets 16 can be attached to the board by means of plastic projections instead of spot welding. Alternatively the brackets can be attached directly to a wall.

In a modified embodiment the limbs 19 and 20 for mounting a box are not interconnected by a web 17. Instead the limbs 19 at one side of a space which shall receive a vertical row of CD-boxes, are provided on a rail and the limbs 20 provided on another rail. These rails are attached vertically on a board or a wall with the limbs mutually spaced a distance corresponding to the width of the CD box. Possibly several rails of this type can be provided on two or more perpendicularly crossing rails to form a lattice-work to be attached to the wall.

What is claimed is:

1. A device for mounting and exposing on a substantially vertical surface CD box of a type having a base for supporting a compact disc, a cover connecting to the base at a hinged end thereof and being pivotable about the hinged end between a closed position and an open position, said base comprising a lower part and an upper part attached to the lower part by snap action, said upper and lower parts forming a gap therebetween at said hinged end, and having a projecting rib at a distal end thereof opposite said hinged end, said device comprising:

a panel to be attached to said surface;

two limbs projecting from said surface mutually spaced a distance corresponding to a width of the CD box between said hinged end and said distal end;

an edge flange on one of said limbs pointing towards the other limb; and at least one projection on said other limb, said limbs being formed to receive the CD box therebetween with said flange inserted into said gap and with said projection snapped over said rib.

2. A device according to claim 1, wherein said limbs are interconnected by a web to form together with said web a U-shaped bracket.

3. A device according to claim 2, wherein said brackets are attached to said panel at the web thereof.

4. A device according to claim 1 for the CD box in which said bottom part is attached to said upper part by means of at least one fin at the hinged end of the CD box, wherein the edge flange of said one limb forms a slot for receiving said fin therein when the edge flange is received by the gap.

5. A device according to claim 1 for the CD box in which said bottom part is attached to the upper part by means of several fins mutually spaced, at the hinged end of the box, wherein the edge flange of said one limb has a width corresponding to a space between adjacent fins to be received therebetween when the edge flange is received by the gap.

6. A device according to claim 2, wherein an end portion of said web at each end thereof is raised in relation to a central portion of the web a shoulder being formed between said central portion and each of said end portions.

* * * * *